May 8, 1951 K. R. WENDT 2,552,357

REGISRATION OF SCANNING PATTERNS OF CATHODE-RAY TUBES

Filed Aug. 31, 1948

INVENTOR
Karl R. Wendt
BY
[signature]
ATTORNEY

Patented May 8, 1951 2,552,357

UNITED STATES PATENT OFFICE 2,552,357

REGISTRATION OF SCANNING PATTERNS OF CATHODE-RAY TUBES

Karl Rinner Wendt, Hightstown, N. J., assignor to Radio Corporation of America, a corporation of Delaware Application August 31, 1948, Serial No. 46,963

1 Claim. (Cl. 315—9)

This invention relates to registration and also to control and adjustment of the size and position of scanning patterns produced by cathode ray tubes, for instance, kinescopes or camera tubes. The invention is applicable to a single tube but is more useful for obtaining accurate registry of the patterns of two or more tubes, as for example, the three images in simultaneous color television.

Registration of a plurality of patterns requires three controls: first, position control or orientation whereby corresponding lines in the respective patterns are adjusted angularly to coincide; second, horizontal size control whereby the widths of the patterns are made equal; and third, vertical size control whereby the heights of the patterns are made equal. By these three controls (plus the usual centering control) registration of the four corners of the patterns is obtainable. According to one feature of the present invention a combination of mechanical and electrical controls is employed for solving the problem of such four-corner registration.

However, misregistry within the four corners of the pattern presents an additional problem. According to another feature of the present invention such problem is solved by connecting the deflecting windings of the respective tubes in parallel; such parallel connections preferably being employed in both the horizontal and vertical deflection systems.

In view of the above, it is an object of the present invention to obtain overall registry of two or more cathode ray tube scanning patterns.

A related object is to obtain identical wave shapes for the sawtooth waves which produce such patterns.

A further object is to provide the three controls above mentioned in a simple, safe, and convenient form.

Other objects and advantages of the invention will become apparent from the following description in connection with the accompanying drawing in which.

In the several figures like reference characters indicate corresponding parts.

Figure 1:
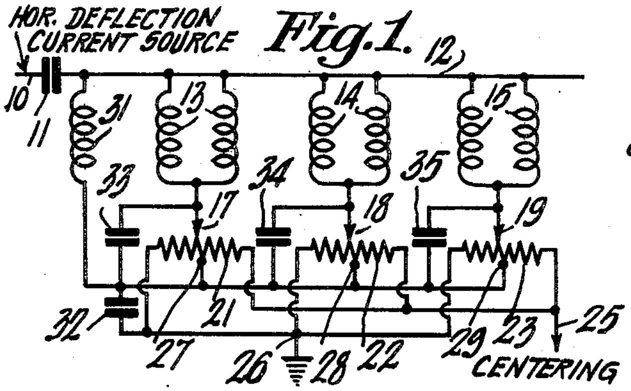
Figure 1 is a diagram of horizontal deflection circuits for three cathode ray tubes.

Referring to Fig. 1 reference character 10 indicates a source of horizontal deflection current which is applied through a coupling condenser 11 to a conductor 12, and thence to horizontal deflecting coils 13, 14, 15 for three cathode ray tubes. It is customary to divide a deflecting coil into two parts so that it can be disposed symmetrically relative to the tube axis, the coil parts being connected in series. While such a series connection may be used in circuits of the present invention, it is preferred to connect the parts of each deflecting coil in parallel, as indicated in the drawing. For the purpose of this description, the two parts (whether connected in series or in parallel) are considered as one deflecting coil, such as 13, 14 or 15. The other ends of said coils are connected individually to adjustable taps 17, 18, 19 on potentiometers 21, 22, 23 respectively. Each of the potentiometers may be part of the usual centering control which provides means for centering the electron spot in its associated cathode ray tube. For a plurality of such tubes as contemplated herein, the potentiometers are connected in common at one end to a source of centering supply voltage 25 and are connected at their other ends in common to a point of fixed potential such as ground 26. Center taps 27, 28, 29 on the respective potentiometers 21, 22, 23 are connected in common and to one end of a choke coil 31, the other end of which is connected to the conductor 12. The coil 31 and condenser 11 provide a high-pass filter for the current from source 10. In by-pass condenser 32 is connected between the center taps and ground 26. Individual by-pass condensers 33, 34, 35 are connected between the respective adjustable taps 17, 18, 19 and the center taps 27, 28, 29.

Figure 2:
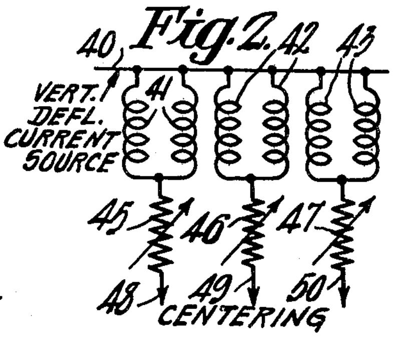
Figure 2 is a diagram of vertical deflection circuits therefor.

In Fig. 2 a conductor 40 connects vertical deflecting coils 41, 42, 43 in common to a source of vertical deflection current which may be the secondary of a transformer (not shown). As stated above, each deflecting coil is illustrated in two parts connected in parallel but considered as one coil. The other ends thereof are connected respectively to variable resistances 45, 46, 47 which are connected respectively to adjustable taps 48, 49, 50 on individual centering means similar to the adjustable taps 17, 18, 19 on potentiometers 21, 22, 23 of Figure 1. Details of the centering means are not shown because they are substantially as shown in Fig. 1. It should be understood that each vertical coil 41, 42, 43 is mounted together with each horizontal coil 13, 14, 15 on respective cathode ray tubes. Ordinarily, the horizontal and vertical deflecting coils for a cathode ray tube are constructed as a unit, sometimes called a yoke, which can be positioned on the neck of the tube.

Figure 3:
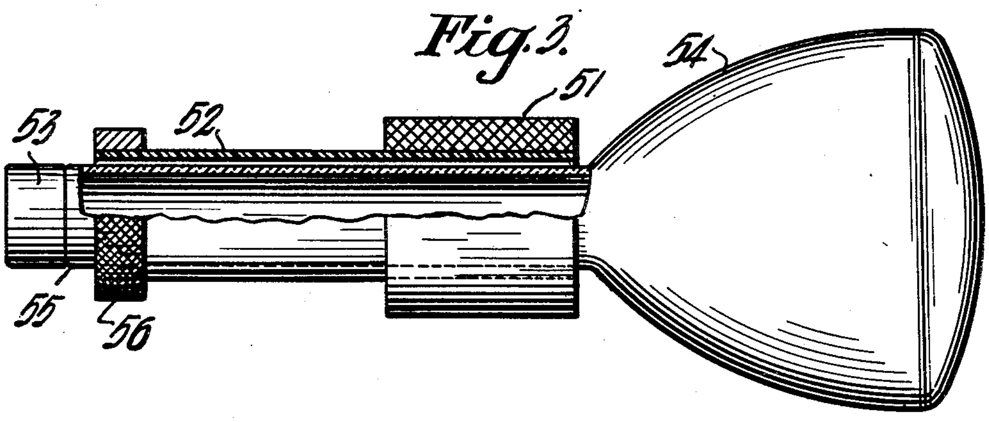
Figure 3 is a partly sectional view illustrating how the present invention may be employed in connection with a cathode ray tube.

Referring to Fig. 3, 51 represents such a unitary structure, or yoke, containing both a horizontal and a vertical deflecting coil. A tubular member 52 supports, or is part of, the yoke and extends therefrom in the direction of the base 53 of cathode ray tube 54. Member 52 has such inside diameter that it can slide over the neck 55 of the tube 54 and can be adjustably positioned thereon both longitudinally and by rotation. A ring 56 secured to that end of member 52 near the base 53 provides means for making such adjustments from a remote position and at a safe distance from the high anode voltage. Both member 52 and ring 56 preferably are made of insulating material, and the latter may be knurled as indicated.

The operation of a plurality of cathode ray tubes as shown in Figure 3, each having thereon vertical and horizontal deflecting coils, will now be described. As stated above, the corresponding coils of the respective tubes are connected in parallel as indicated in Figures 1 and 2, such parallel connection having been found superior to the series connection formerly used. With the latter connection, the voltages to ground are different for the coils of the respective tubes, hence the capacities to ground carry different currents, which cause dissimilarity in the scanning patterns produced by the respective tubes. Also, if there are differences in the inductance of the respective deflecting coils, such differences will vary the patterns to substantially the same extent when the current is the same in each coil, as it should be in a series connection. With a parallel connection, however, the voltages and capacities to ground are alike, and a coil with higher inductance receives less current which tends to make the patterns more nearly alike. Thus, substantially identical wave shapes of the sawtooth waves which produce the scanning patterns in the respective cathode ray tubes, are obtained by the parallel connection above described.

The scanning patterns produced by a plurality of cathode ray tubes ordinarily will not have the same width or height and, when they are superimposed, their edges may be angularly disposed to each other. Continuing with the operation of a plurality of cathode ray tubes as illustrated in Figures 1 to 3, the angularity is corrected by rotating the assembly comprising ring 56, member 52 and yoke 51 on one or more tubes until the scanning patterns are properly oriented. If one pattern is wider than another, the said assembly is adjusted longitudinally on neck 55 until the patterns have the same width. These adjustments may be made by grasping the ring 56, so that the danger of coming in contact with the high anode voltages applied to tube 54 is avoided. After the widths of two or more scanning patterns are made exactly equal and registration thereof obtained in a horizontal direction, the vertical heights may be equalized by varying one or more of the resistances such as 45, 46, or 47 in Figure 2, which resistances control the heights of the scanning patterns produced by the respective vertical deflecting coils. This is so because vertical deflecting coils are predominantly resistive and added resistance changes the amplitude without appreciable effect on the shape of the sawtooth wave.

Such electrical means for controlling the height have been found to be particularly advantageous in connection with the mechanical means for controlling the width and orientation because, as previously mentioned, it is desirable to make the vertical and horizontal deflecting coils as a unit whereby it is not possible to move one coil relative to the other. Hence, according to the present invention, the whole coil unit or yoke, is moved longitudinally for width adjustment and is rotated for orientation and then the height is adjusted electrically. By these three adjustments the four corners of two or more superposed scanning patterns can be brought into register.

It is assumed in the above description that the several cathode ray tubes are initially set up and secured in position so that their respective scanning patterns are superimposed. Any necessary adjustment of the entire scanning pattern of any tube to right or left, or up or down, may be made by the respective centering controls.

Figures 4, 5:
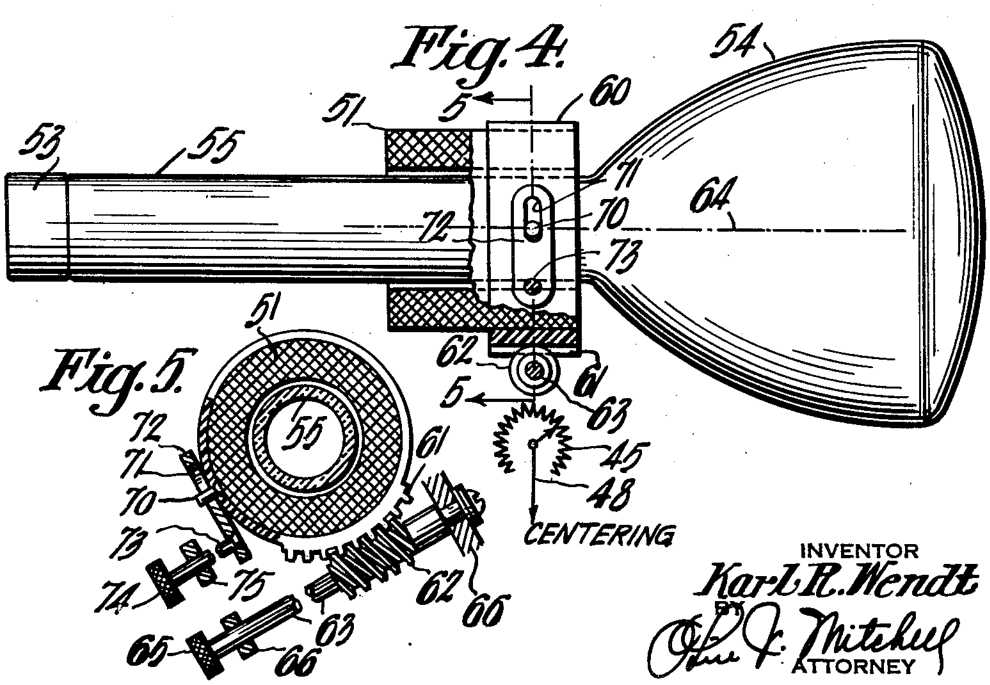
Figure 4 shows a modification, also partly in section.
Figure 5 is a cross-section taken on line 5—5 of Figure 4.

Referring now to Figs. 4 and 5 which show a modification of the arrangement shown in Fig. 3, the coil unit or yoke 51 is positioned on the neck 55 of cathode ray tube 54 by a mechanism comprising a tubular or ring member 60 surrounding and secured to yoke 51. On a portion of its periphery member 60 is provided with straight teeth 61 extending along its length and engaged by a worm 62 which is mounted on a shaft 63 disposed transversely to the axis 64 of tube 54. Shaft 63 is made long enough to permit rotation thereof by a knob 65 secured to its remote end without danger of the operator coming into contact with the high anode voltage applied to tube 54. Suitable bearings such as indicated at 66 are provided for the shaft 63. Rotation of member 60 and yoke 51 is thus obtained by rotation of the knob 65, and the worm gearing 62, 61 automatically locks the yoke in adjusted position.

For longitudinal movement of yoke 51, member 60 is provided with a pin 70 projecting from its surface and disposed in a slot 71 in a lever 72 which is secured at one end to a rotatable shaft 73. A knob 74 is secured to the other end of shaft 73 which also is provided with bearings 75 and is of such length that the knobs 74 and 65 are adjacent each other. For convenience, an electrical height control comprising a variable resistance such as 45 (see Fig. 2) may be mounted adjacent to knobs 65 and 74 so that all three controls can be operated from the same remote position at a safe distance from the cathode ray tube 54. It will be noted that worm 62 and straight teeth 61 permit rotational adjustment of yoke 51 independent of the longitudinal adjustment by means of lever 72 within the limits of movement of the latter.

The scanning patterns of two or more cathode ray tubes as shown in Figs. 4 and 5 are first superimposed and then the four corners are brought into register substantially as described in connection with Figs. 1 to 3.

The arrangements shown in the drawing are merely illustrative of the invention and one use thereof, it being obvious that changes and modifications may be made to suit other uses and requirements.

What is claimed is:

Apparatus for producing images on each of a plurality of cathode ray tubes in such manner that they may be superimposed in exact registry by an optical system comprising a plurality of cathode ray tubes, a source of horizontal deflection voltage waves, a plurality of horizontal deflection coils, each of said deflection coils connected in parallel with said source and associated with one of said cathode ray tubes, a plurality of vertical deflection coils, a plurality of variable resistors one end of each being connected to one of said vertical deflection coils, a plurality of sources of adjustable potentials, each of said latter sources being connected to the other end of one of said resistances, and a source of vertical sweep voltage waves connected in parallel with all of said series combinations of vertical deflection coils, variable resistors and sources of adjustable potentials.

KARL RINNER WENDT.

REFERENCES CITED

The following references are of record in the file of this patent:

UNITED STATES PATENTS

| Number | Name | Date |
|---|---|---|
| 1,390,727 | Schenkel | Sept. 13, 1921 |
| 2,177,688 | Cawein | Oct. 31, 1939 |
| 2,223,990 | Holmes | Dec. 3, 1940 |
| 2,260,546 | Tingley | Oct. 28, 1941 |
| 2,280,733 | Tolson | Apr. 21, 1942 |
| 2,369,631 | Zanarini | Feb. 13, 1945 |
| 2,389,995 | Packer | Nov. 27, 1945 |
| 2,393,601 | Baldwin, Jr. | Jan. 29, 1946 |
| 2,414,939 | Fitch | Jan. 28, 1947 |
| 2,416,687 | Fry | Mar. 4, 1947 |
| 2,418,487 | Sproul | Apr. 8, 1947 |
| 2,451,641 | Torsch | Oct. 19, 1948 |
| 2,447,804 | Holst | Aug. 24, 1948 |
| 2,455,456 | Whittaker | Dec. 7, 1948 |
| 2,457,911 | Munster | Jan. 4, 1949 |